United States Patent [19]
Stageberg et al.

[11] Patent Number: 6,118,627
[45] Date of Patent: Sep. 12, 2000

[54] THIN FILM HEAD DESIGN IMPROVING TOP POLE WIDTH CONTROL

[75] Inventors: Frank E. Stageberg, Edina; Brian S. Zak, Excelsior, both of Minn.

[73] Assignee: Seagate Technology LLC, Bloomington, Minn.

[21] Appl. No.: 08/331,684

[22] Filed: Oct. 31, 1994

[51] Int. Cl.[7] .................................................. G11B 5/147
[52] U.S. Cl. ........................................................ 360/126
[58] Field of Search ................................... 360/119, 120, 360/125–127

[56] References Cited

U.S. PATENT DOCUMENTS

| | | | |
|---|---|---|---|
| 4,839,197 | 6/1989 | Henderson | 427/116 |
| 4,841,624 | 6/1989 | Togawa et al. | 29/603 |
| 4,896,417 | 1/1990 | Sawada et al. | 29/603 |
| 5,130,877 | 7/1992 | Hsie et al. | 360/126 |
| 5,137,750 | 8/1992 | Amin et al. | 427/116 |
| 5,200,056 | 4/1993 | Cohen et al. | 205/122 |
| 5,245,493 | 9/1993 | Kawabe et al. | 360/126 |
| 5,254,373 | 10/1993 | Barr | 427/498 |
| 5,282,308 | 2/1994 | Chen et al. | 29/603 |

*Primary Examiner*—William Klimowicz
*Attorney, Agent, or Firm*—Kinney & Lange

[57] ABSTRACT

A thin film inductive head comprising a bottom pole, an insulation region fabricated on the bottom pole, a cavity layer formed on the insulation region, the cavity layer containing an aperture, and a top pole deposited on the cavity layer so that the top pole lies substantially in the aperture of the cavity layer and has a height at least partially defined by the depth of the aperture.

14 Claims, 8 Drawing Sheets

THIN FILM HEAD DESIGN IMPROVING TOP POLE WIDTH CONTROL

BACKGROUND OF THE INVENTION

The present invention relates to the fabrication of thin film inductive heads for data storage systems. More particularly, the invention relates to the formation of the top pole and improving the width control thereof.

Thin film inductive read/write heads are used for magnetically reading and writing information on a magnetic storage medium, such as a magnetic disc, which moves relative to the head. A thin film inductive head comprises a pair of "poles" which form the magnetic core of the head. Electrical conductors (or coils) pass between the poles and are used for reading information from and/or writing information to the magnetic storage medium. A gap region occupies a small space between two pole tips of the magnetic core. During a write operation, electrical current is caused to flow through the coils generating a magnetic field in the core. The write current in the coils causes magnetic flux to span the gap region. This magnetic flux is then used to impress the magnetic field upon a storage medium, which is then recorded. Reversal of the write current induces variations in the magnetic recording which convey information. During a read operation, the transitions on the storage medium induce reversals of magnetic flux in the core which induces changes in electrical signals in the coils. The changing electrical signals in the coils may be sensed with electric circuitry which enables the recovery of information stored on the magnetic medium.

Four main elements of a thin film inductive head are a bottom magnetic pole, a gap material which provides spacing between the poles, one or more levels of electrical conducting coils interposed within insulation layers, and a top magnetic pole.

During a typical formation process, the bottom magnetic pole is formed on a substrate. Typically, the bottom magnetic pole has a wider region called the "paddle" and a narrower region called the "tip." After the bottom magnetic pole is formed, a gap material is deposited on the entire surface of the bottom magnetic pole. Electrical conducting coils are then interposed between insulation layers over the bottom magnetic pole in the paddle region. These layers of insulation and coils in the paddle region create a hill sloping from the paddle region to the pole tip. Finally, a top magnetic pole is formed on the top insulation layer, following the contour of the hill.

Thin film inductive heads require the use of the top magnetic pole in order to complete the magnetic linkage path through the coil structure. It is important to correctly shape the top magnetic pole with predictably consistent dimensions for proper performance. The top pole can be pattern plated by using a photoresist layer which precisely determines the feature dimensions. Alternatively, the top pole can be patterned to final dimensions by ion milling with a sacrificial photoresist pattern.

For both of these methods of forming a top pole, a minimal thickness of photoresist must be used to achieve acceptable results. For pattern plating, the photoresist layer must be thicker than the plated top pole thickness to prevent overplating. Overplating is undesirable since an overplated region does not have well controlled vertical walls. Thus, the exact width dimensions of the top pole will vary from head to head depending on the severity of the overplating. In this way, it is difficult to manufacture inductive heads with predictable top pole widths. In addition, overplating can cause magnetic instability which will add to the overall instability of the inductive head. Poor overall performance is often the result.

Similarly, during the ion milling process, the sacrificial photoresist used must be thick enough to prevent any portion of the magnetic pole from being milled. When the sacrificial photoresist is too thin, some regions of the top pole can accidentally get milled. This causes severe damage to the inductive head and frustrates the performance.

The photoresist used in pole plating and in the ion milling process is often applied by a spin application. The combination of this application with the geometry of the hill causes the photoresist to be thinnest at the top of the hill. Typically, the fabricator will compensate for the thin coating by applying a thicker coating at the hill. This invariably causes even more thickness over the pole tip. The disadvantage of this correction is the increased difficulty in controlling the photoresist pattern within the pole tip region because of the increased thickness there. It becomes extremely difficult to form the required relatively narrow pole tip width when the photoresist on top of it is so relatively thick. A formation process and corresponding structure which could overcome these difficulties would be a significant improvement to the art.

SUMMARY OF THE INVENTION

The present invention is an improved thin film inductive head and a method of making the same. The thin film inductive head of the present invention has a bottom pole, an insulation region fabricated on the bottom pole, a cavity layer formed on the insulation region and a top pole formed on the cavity layer. The cavity layer has an aperture having a depth at least partially defining the height of the top pole.

The method of making the thin film inductive head of the present invention includes fabricating a bottom magnetic pole on a substrate, fabricating an insulation layer on the bottom magnetic pole, and forming a cavity layer on the insulation layer. The cavity layer has an aperture of predetermined depth. A top pole photoresist layer is then spun coat on the cavity layer and then used as a pattern for forming a top magnetic pole. The top magnetic pole is then fabricated on the cavity layer within the aperture of the cavity layer, and the top magnetic pole has a height at least partially based on the depth of the aperture.

Alternatively, the top magnetic pole is formed in the aperture of the cavity layer, with extra wide pole tips. A sacrificial photoresist layer is then used as a pole tip ion mill mask. In this way, an ion milling process is used to mill away the top magnetic pole, with the sacrificial mask protecting the remaining head structure, leaving behind a properly shaped top pole piece.

The thin film inductive head of the present invention has predictable and consistent top pole width, resulting in improved magnetic stability and improved overall performance of the inductive head.

DETAILED DESCRIPTION OF THE PREFERRED EMBODIMENTS

The present invention is directed to an improved, thin film inductive head and method of fabricating the same. Four main elements of a thin film inductive head are a bottom magnetic pole, a gap material, one or more levels of electrical conducting coils interposed within insulation layers, and a top magnetic pole. The present invention is directed to the formation of the top magnetic pole utilizing an additional layer to create a cavity bowl or aperture within which the top magnetic pole is formed. Formation of the top magnetic pole in this way creates a improved top pole tip with accurate width dimensions.

Figure 1:
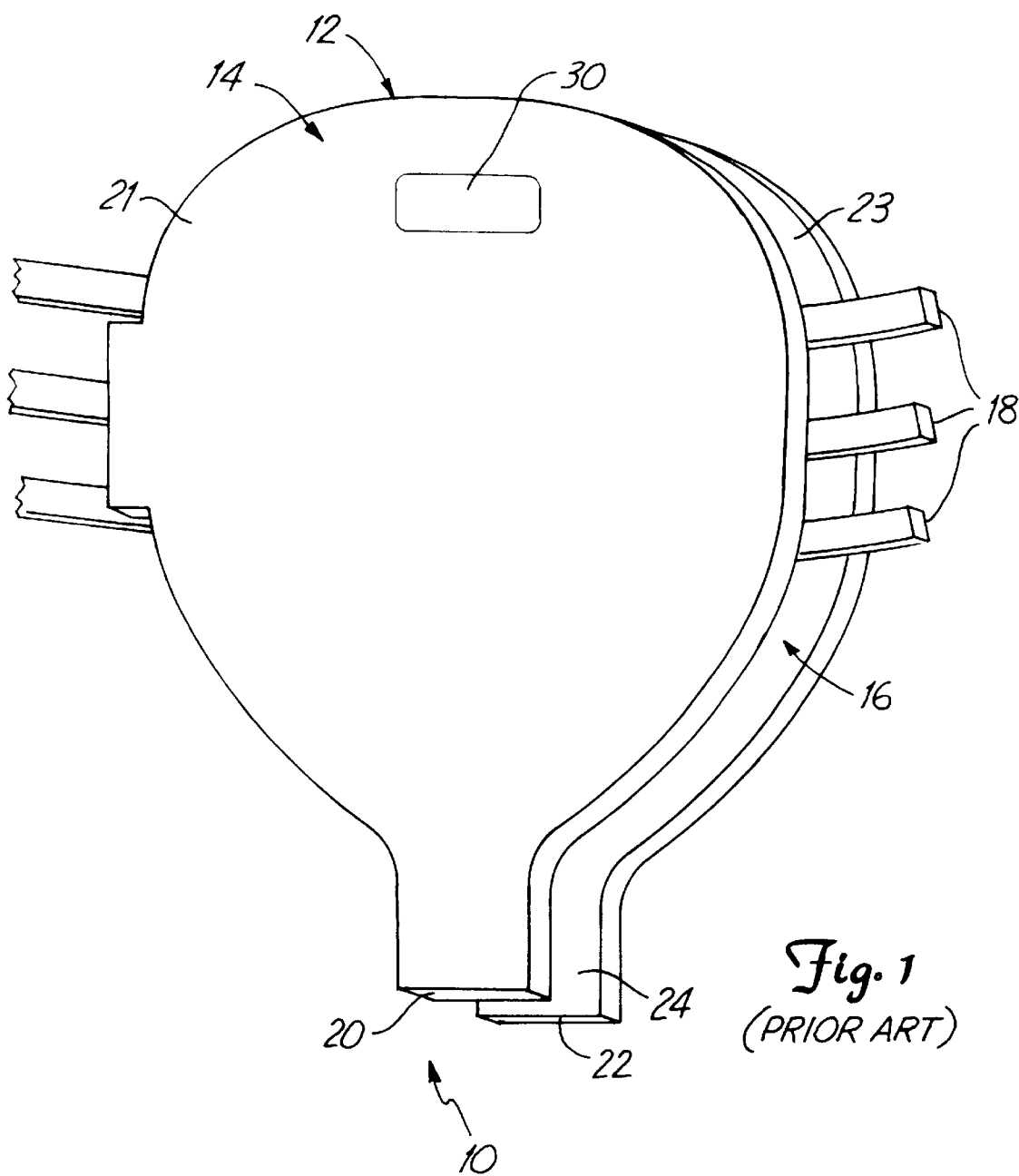
FIG. 1 is a plan view of a prior art thin film inductive read/write head.

FIG. 1 is a plan view of prior art thin film head 10 comprising core 12 having top pole piece 14, bottom pole piece 16, and pole center 30, coil windings 18, and gap 24. Top pole piece 14 includes top pole paddle 21 and top pole tip 20. Bottom pole piece 16 includes bottom pole paddle 23 and bottom pole tip 22. Coil windings 18 extend through thin film head 10 and are sandwiched between top pole piece 14 and bottom pole piece 16 proximate to top and bottom pole paddles 21 and 23. Gap 24 is formed between top pole tip 20 and bottom pole tip 22. Pole center 30 joins top and bottom pole pieces 14 and 16 at a location remote from gap 24 to complete the magnetic circuit. Typically, an insulation layer, such as a layer of alumina ($Al_2O_3$) (shown as gap layer 19 in FIG. 3), fills gap 24. A magnetic storage medium (not shown) may be placed near gap 24 such that information may be written on or read from the medium.

During operation, a magnetic storage medium, such as a magnetic disc, moves in the region near gap 24 formed between top pole tip 20 and bottom pole tip 22. The magnetic storage medium is oriented in a plane nominally parallel to the plane formed by pole tips 20 and 22 in close spaced relation to gap 24. As electrical write current flows in coil windings 18, a magnetic field is applied to thin film head 10 to flow along top and bottom pole pieces 14 and 16 and pole center 30. For example, top pole tip 20 may become an increasingly strong north pole, while bottom tip 22 becomes a south pole under the influence of the induced magnetic field. This causes a fringe field (not shown) to form around gap 24. As the write current is reversed, the magnetic orientation of pole tips 20 and 22 reverse to reverse the fringe field around gap 24. This changing fringe field is utilized to write information on the magnetic disc.

FIGS. 2–6 show prior art thin film inductive head 10. Thin film head 10 includes substrate 26, insulation basecoat layer 27, bottom pole piece 16, bottom pole tip 22, bottom pole paddle 23, gap 24, gap layer 19, pole center 30, first insulation layer 28, a bottom layer of coil windings 18, second insulation layer 29, a top layer of coil windings 18, third insulation layer 32, metallic seed layer 33, hill region 25, top pole piece 14, overplate 35 and top pole photoresist layer 36.

Figure 2:
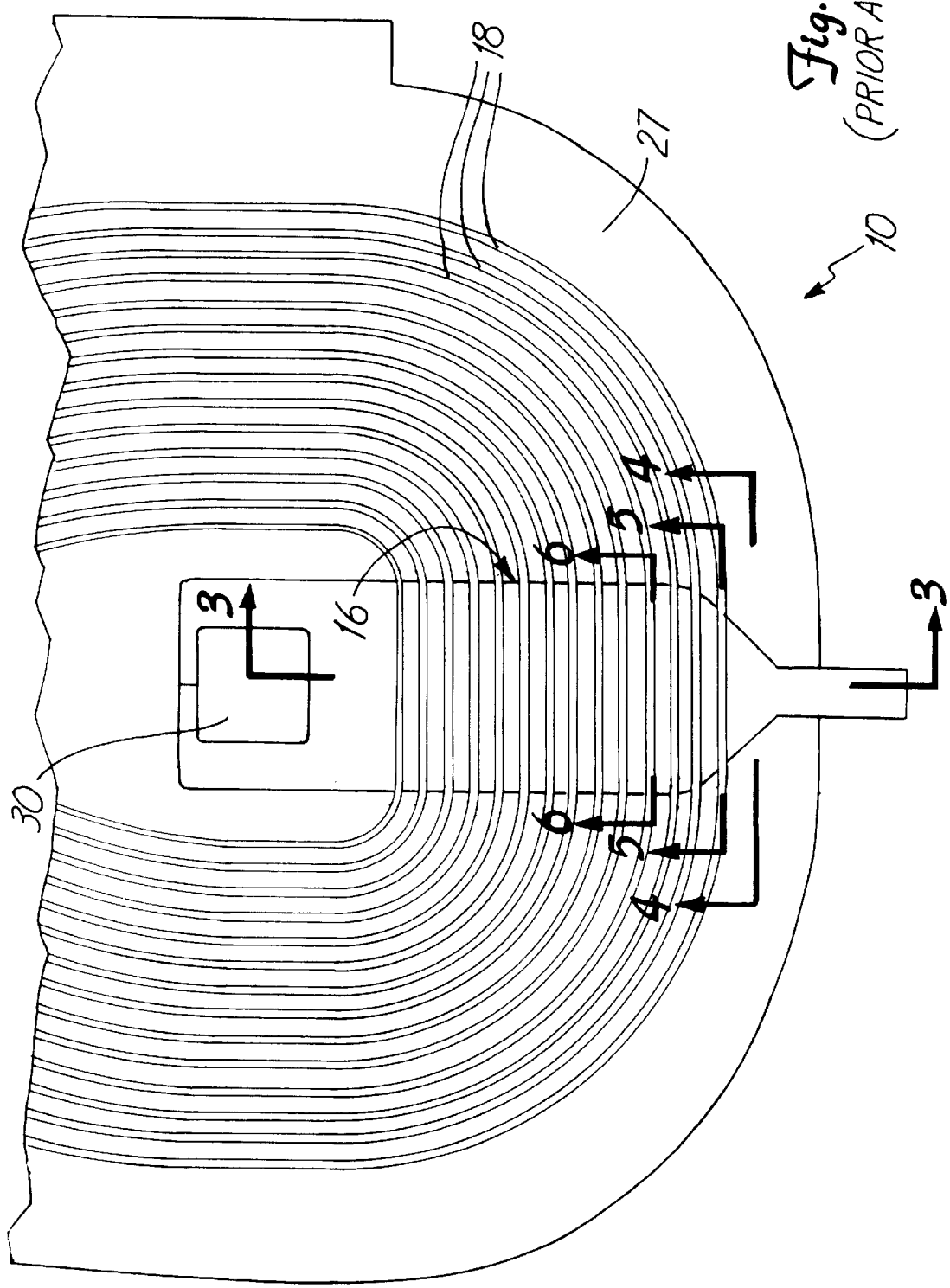
FIG. 2 is a top view of a partially formed prior art thin film inductive head.
Figure 3:
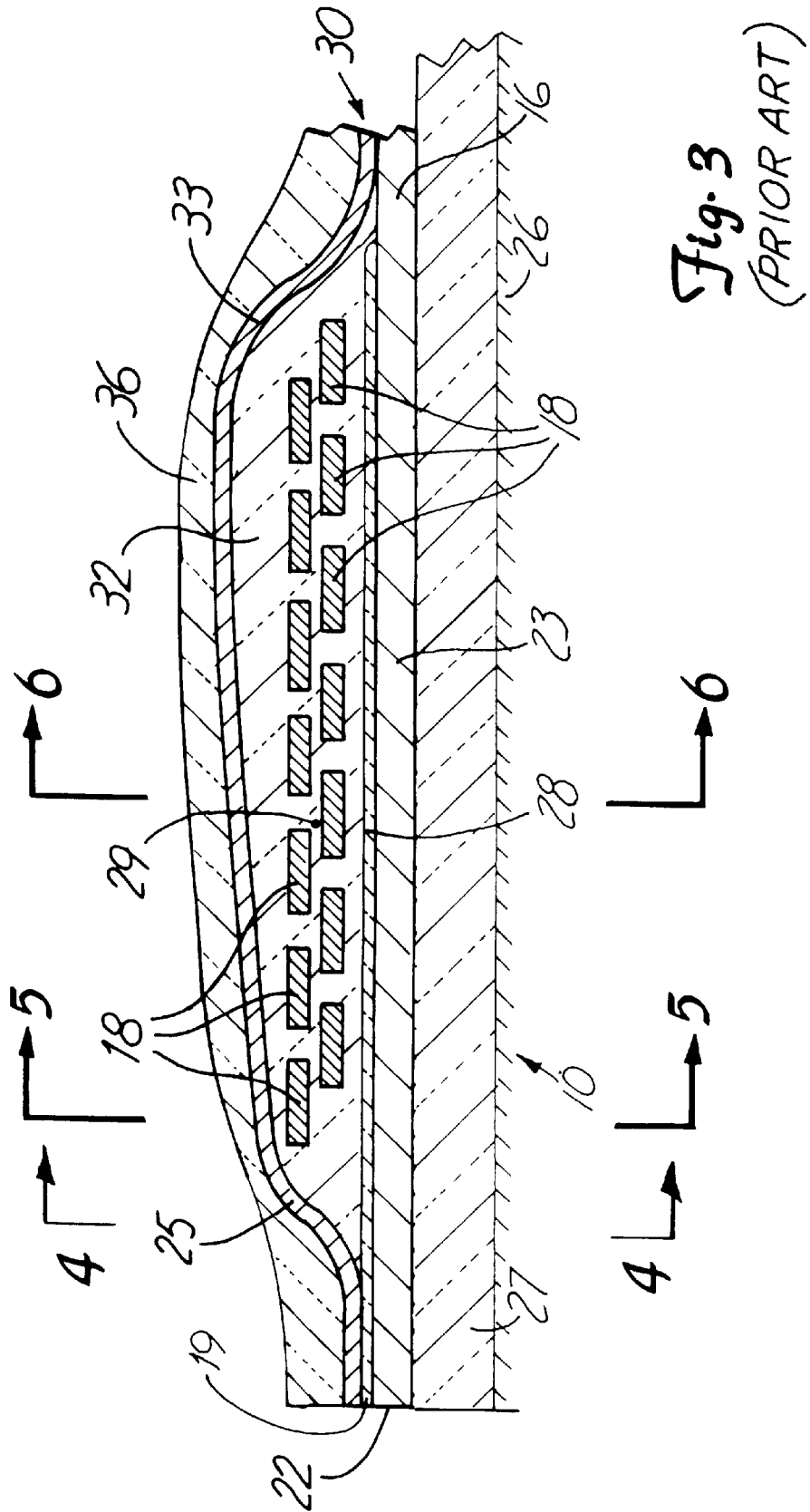
FIG. 3 is a cross-sectional view of a partially formed prior art thin film inductive head as seen from line 3—3 in FIG. 2.

Thin film head 10 shown in FIGS. 2 and 3 is only partially formed. In FIG. 2 first insulation layer 28 and gap layer 19 are removed so that lower portions of the head may be viewed. In FIG. 3 top pole piece 14 is not yet formed so the disadvantages of the prior art design are more clearly shown.

During fabrication, multiple heads similar to thin film head 10 may be deposited across an entire surface of substrate 26. For the purposes of this example, however, only the fabrication of a single thin film head 10 is shown.

Typically, the formation of thin film head 10 begins on substrate 26. Insulation basecoat layer 27 is deposited on a surface of substrate 26. Next, bottom pole piece 16 is formed on a surface of insulation basecoat layer 27. Gap layer 19 is then deposited over bottom pole piece 16, extending out over bottom pole tip 22. Next, first insulation layer 28 is deposited over bottom pole piece 16 and gap layer 19. A bottom layer of coil windings 18 are then formed on first insulation layer 28 and wound around pole center 30. Pole center 30 magnetically joins top and bottom pole pieces 14 and 16 at a location remote from pole tips 20 and 22 to complete the magnetic circuit. Next, second insulation layer 29 is deposited over coil windings 18. A top layer of coil windings 18 are then formed over second insulation layer 29. Third insulation layer 32 is then deposited over coil windings 18.

Thin film head 10 typically uses two levels of coil windings 18 around pole center 30. A portion of coil windings 18 are sandwiched between top and bottom pole pieces 14 and 16 and interposed between layers of insulation. Insulation layers 28, 29, and 32 are typically cured photoresist, which is an organic insulator. An insulator material is necessary to separate coil windings 18 from each other, as well as from core 12, to avoid shorting.

Often, a yoke (not shown) is formed adjacent to top and bottom pole paddles 21 and 23. The yoke is a magnetic material which lowers the magnetic resistance path and increases the overall permeability of thin film head 10.

Insulation layers 28, 29, and 32, as well as coil windings 18, are located over bottom pole paddle 23 and do not extend out over bottom pole tip 22, as shown in FIG. 3. Gap 24 is located over bottom pole tip 22. Because there is a buildup of materials over bottom pole paddle 23 and not over bottom pole tip 22, hill region 25 develops in the formation process. Hill region 25 slopes from the buildup of insulation layers 28, 29, and 32 (over bottom pole paddle 23) down to bottom pole tip 22.

Metallic seed layer 33 is then typically deposited on third insulation layer 32. Metallic seed layer 33 is customarily a conducting permalloy material that is of uniform thickness. Top pole photoresist layer 36 is then spun down onto metallic seed layer 33, and therefore has a varying thickness as shown in FIG. 3. Top pole photoresist layer 36 is used to form top pole piece 14.

Top pole photoresist layer 36 is then patterned for top pole piece 14. Typically, a chrome photomask (not shown) is placed over top pole photoresist layer 36 and ultraviolet light is exposed over the entire layer. The chrome photomask allows the ultraviolet light to expose top pole photoresist layer 36 only in the area where top pole piece 14 will ultimately be formed. When the ultraviolet light exposes top pole photoresist layer 36 (only in the area where top pole piece 14 will be located), it changes the development properties of the photoresist. Thus, when top pole photoresist layer 36 goes through a developing process, all regions which were exposed to ultraviolet light wash away and those regions that were blocked by the chrome photomask remain. In this way, an opening or mold is constructed for the formation of top pole piece 14.

Because top pole photoresist layer 36 is spun on in liquid form, it is much thinner at hill region 25 than it is in the regions above bottom pole tip 22 and bottom pole paddle 23.

While in a liquid form, centrifugal force on the photoresist causes some of the photoresist to flow down hill region 25 toward gap 24. This results in top pole photoresist layer 36 being very thin at the sloped portion of hill region 25 and relatively thick above gap 24 (as seen in FIG. 3). The thinness of top pole photoresist layer 36 at hill region 25 retards its ability to act as a mold for top pole piece 14 and causes deformities in top pole piece 14. When top pole piece 14 is ultimately formed in top pole photoresist layer 36, the height of top pole photoresist layer 36 will be insufficient at hill region 25 to allow top pole photoresist layer 36 to effectively act as a mold for top pole piece 14.

Top pole piece 14 (shown in FIGS. 4–6) is formed at a uniform height in the opening of top pole photoresist layer 36. The formation of top pole piece 14 in done by an electroplating process, using metallic seed layer 33 exposed by the opening in top pole photoresist layer 36. The conductive properties of metallic seed layer 33 are then utilized to form or "plate up" the conductive top pole piece 14 within the opening in top pole photoresist layer 36. In this way, the dimensions and overall shape of top pole piece 14 is defined by the opening in top pole photoresist layer 36.

As an alternative to pattern plating top and bottom pole tips 20 and 22 to final dimensions, pole tips 20 and 22 may be plated to wider dimensions, and then formed to final dimensions by an ion milling process using a sacrificial photoresist layer. The ion milling process involves covering a surface with a layer of sacrificial photoresist, then milling away material by bombarding the surface with ions.

During the ion milling process, after insulation layers 28, 29, and 30 and coil windings 18 are formed, top pole piece 14 is formed using the above-described process, except that top pole piece 14 and bottom pole piece 16 are purposely formed with extra wide pole tips 20 and 22. Next, a layer of sacrificial photoresist (not shown) is spun down over the entire surface. The sacrificial photoresist layer is then exposed through a chrome photomask to define the desired width specifications of top and bottom pole tips 20 and 22. After the exposed portions of the sacrificial photoresist are washed away, top and bottom pole tips 20 and 22 are ion milled. The area which has been left unprotected by the sacrificial photoresist layer will be milled away. Those areas which retained the sacrificial photoresist will be protected and not milled away. This process produces top and bottom pole tips that are properly shaped.

Any sacrificial photoresist left behind is then typically stripped off. Acetone ($CH_3COCH_3$) may be used to remove any remaining sacrificial photoresist, as well as any remaining top pole photoresist layer 36 in the plating process, without adversely effecting top pole piece 14.

As an alternative to pattern plating top and bottom pole pieces 14 and 16, the ion milling process can also be used to form the pole pieces. Top and bottom pole pieces 14 and 16 may be formed by sputtering down a magnetic material and then spinning down a layer of sacrificial photoresist on a surface of the magnetic material. The sacrificial photoresist layer is then exposed through a chrome photomask, as previously described, to define the desired shape of the individual pole piece. After the exposed portions of the sacrificial photoresist are washed away, the pole piece is ion milled. In this way, a properly shaped pole piece is left behind.

Figure 4:
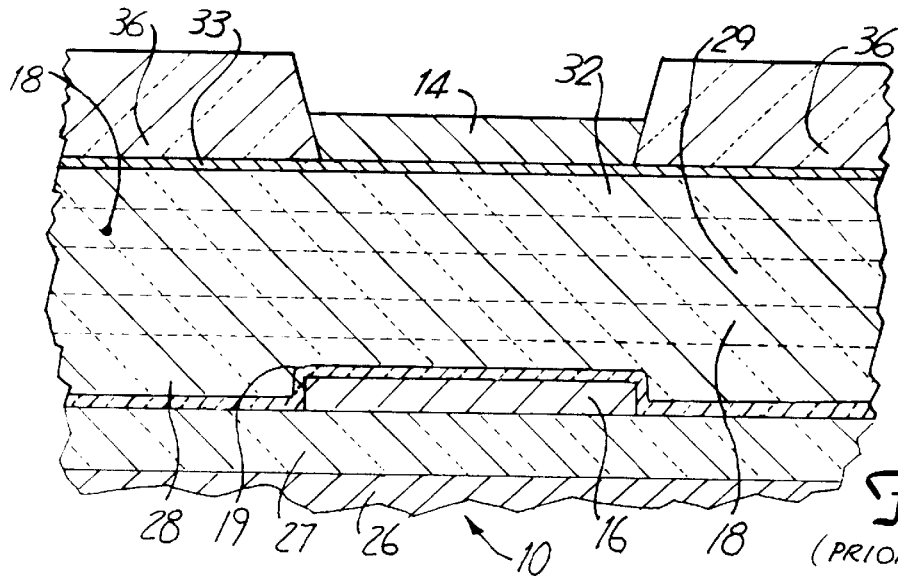
FIGS. 4, 5, and 6 are parallel cross-sectional views taken at lines 4—4, 5—5, and 6—6, respectively, in each of FIGS. 2 and 3.
Figure 5:
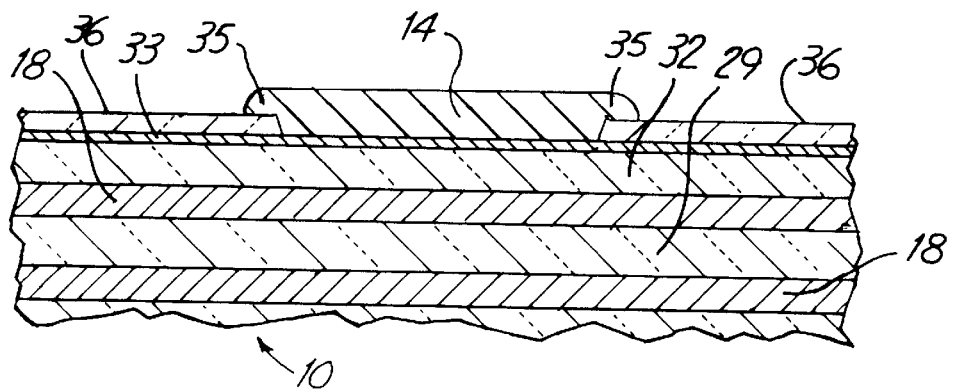
Figure 6:
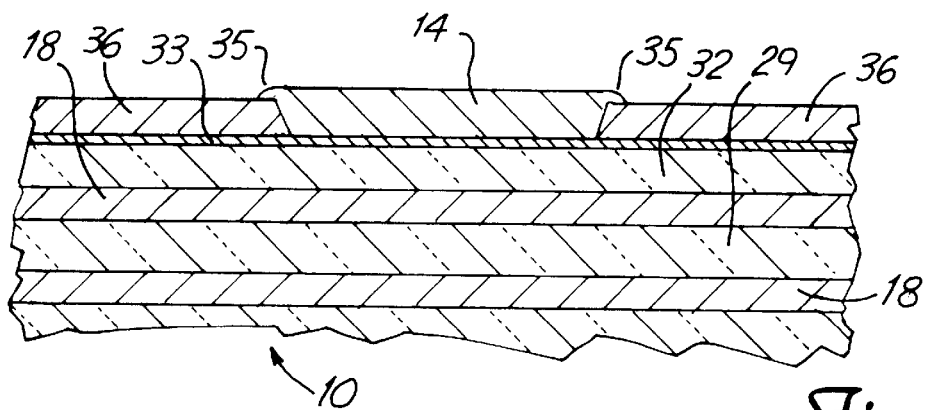

There are significant disadvantages to prior art thin film head 10. The inability of top pole photoresist layer 36 to act as an effective mold for top pole piece 14 is illustrated in FIGS. 4–6. FIG. 4 shows that, at the base of hill region 25, top pole photoresist layer 36 is relatively thick because of the tendency of the material to flow down hill region 25 into that area. Top pole piece 14 is deposited to a uniform thickness, well within the height of top pole photoresist layer 36 in the region of gap 24. Thus, a sufficient mold exists for the formation of top pole piece 14 in this area.

However, as shown in FIG. 5, on the slope of hill region 25 top pole photoresist layer 36 is thinnest because of the tendency of the material to flow out of that area toward gap 24. Top pole piece 14 is deposited to a uniform thickness that is higher than the top surface of top pole photoresist layer 36, usually resulting in a deformation of top pole piece 14 and the formation of overplate 35 as shown in FIG. 5. Thus, when the top surface of top pole photoresist layer 36 is lower than the top surface of top pole piece 14, which is especially true at hill region 25, top pole piece 14 tends to "mushroom" over top pole photoresist layer 36. Thus, overplate 35 is formed, which leads to top pole piece 14 having non-vertical plated walls, and a width which varies with each individual thin film head 10, depending on the severity of overplate 35 for the particular head. Thus, it is not possible to control the dimensions of the manufactured top pole piece. In addition, magnetic instability can result from overplate 35. This adversely effects the performance of prior art thin film head 10.

As shown in FIG. 6, top pole photoresist layer 36 is also thin in the region directly above bottom pole paddle 23. In this area, top pole photoresist layer 36 is still relatively thin because of the tendency of the material to flow out of that area toward gap 24. Thus, overplate 35 is also formed in this area with the same adverse effects on the performance of thin film head 10.

Prior art thin film head 10 also has problems with the formation of top pole piece 14 using the ion milling process. During the ion milling process the sacrificial photoresist layer used tends to be thinnest above the hill region because of the tendency of the photoresist to flow to the pole tips. As a result, top pole piece 14 may be damaged during the milling process, particularly at the pole tips. The ion milling penetrates all the way through the sacrificial photoresist in the hill region, because of the thinness of the sacrificial photoresist there, and can partially mill the top pole.

FIGS. 7–13 show thin film head 40 in accordance with the present invention. Thin film head 40 includes substrate 56, insulation basecoat 57, insulation layers 58, 59, and 62, bottom pole piece 46, bottom pole tip 52, bottom pole paddle 53, gap 54, gap layer 49, pole center 60, coil windings 48, metallic seed layer 63, hill region 55, top pole piece 44, top pole tip 50, top pole paddle 51, photoresist cavity insulation layer 64, barrier wall 67 and top pole photoresist layer 66.

Insulation basecoat 57 is deposited on substrate 56. Bottom pole piece 46 is formed on insulation basecoat 57. Next gap layer 49 is then deposited over bottom pole piece 46, extending out over bottom pole tip 52. Insulation layer 58 is deposited on bottom pole piece 46 and gap layer 49. A lower level of coil windings 48 are formed on a surface of insulation layer 58 and wound around pole center 60. Insulation layer 59 is then deposited on coil windings 48. An upper layer of coil windings 48 are then formed on a surface of insulation layer 59. Insulation layer 62 is then deposited on coil windings 48. The alternation of coils 48 and insulation layers 58, 59, and 62 form hill region 55.

Insulation layers 58, 59, and 62 are formed individually and are each cured so that they become a permanent part of thin film head 40. For example, after insulation layer 62 is formed over coil windings 48, it is cured and becomes permanent. In this way, it will not be affected by subsequent layers. The same is true for insulation layers 58 and 59.

Figure 12:
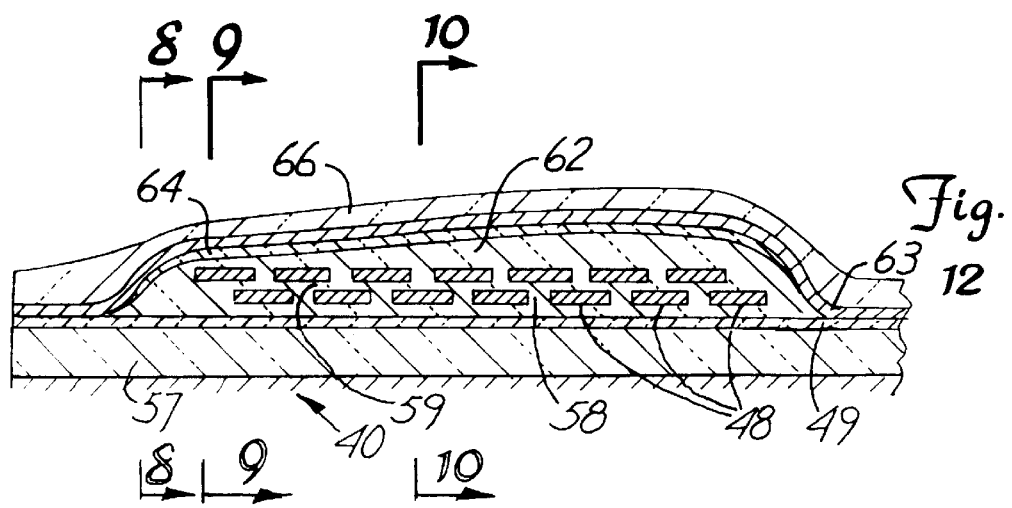

Photoresist cavity insulation layer 64 of the present invention is then formed on insulation layer 62. Cavity insulation layer 64 is a photoresist material that is spun on and formed with an aperture, creating a cavity bowl directly above bottom pole piece 46. Cavity insulation layer 64 is formed above bottom pole paddle 53 and also in hill region 55, but is not in the area above gap 54 near the pole tips, as shown in FIG. 12. Top pole piece 44 is later deposited within the cavity bowl formed by cavity insulation layer 64 (as seen in FIGS. 7–10). Cavity insulation layer 64 is also cured so that it becomes a permanent part of thin film head 40.

After cavity insulation layer 64 is formed on insulation layer 62, metallic seed layer 63 is deposited over cavity insulation layer 64 and, in the cavity bowl of cavity insulation layer 64, on insulation layer 62. Metallic seed layer 63 is a conformal material, that is, it retains the shape of cavity insulation layer 64 and insulation layer 62 (as seen in FIGS. 9–13). Metallic seed layer 63 is also a conducting material which is necessary for electroplating top pole piece 44.

Next, top pole photoresist layer 66 is spun down on top of metallic seed layer 63. When top pole photoresist layer 66 is spun on it is thinner on hill region 55 than on the pole tips, as seen in FIG. 12. This occurs because of the nature of the spin application of the photoresist material that makes up top pole photoresist layer 66 and because of the geometry of hill region 55. A chrome photomask is used to form an opening in top pole photoresist layer 66 in the region directly above bottom pole piece 46.

Top pole piece 44 is plated within the opening in top pole photoresist layer 66 and within the cavity bowl or aperture in cavity insulation layer 64. Top pole piece 44 is formed by an electroplating process using metallic seed layer 63 as previously described.

Cavity insulation layer 64 effectively raises the surface of top pole photoresist layer 66 as top pole piece 44 is formed in the lowered aperture or cavity bowl. In this way, top pole piece 44 is plated to a uniform thickness, and within the height of top pole photoresist layer 66. This height differential exists even in hill region 55. That is, the uniform height of top pole piece 44 is lower than top pole photoresist layer 66 even in hill region 55. Thus, the sides of top pole piece 44 are defined by the opening in top pole photoresist layer 66, and no overplating is possible. Consequently, top pole piece 44 has very well controlled edges, even in hill region 55, with a well defined width for top pole piece 44. This leads to superior design and performance.

The cavity bowl of cavity insulation layer 64 is aligned with top pole tip 50. The cross-section shown in FIG. 11 passes directly through the aperture of cavity insulation layer 64. Thus, cavity insulation layer 64 is not shown in FIG. 11 above metallic seed layer 63. However, the cross-section shown in FIG. 12 is taken off-center of thin film head 40 and thus does not pass through top or bottom pole piece 44 or 46. Thus, cavity insulation layer 64 and top pole photoresist layer 66 are shown above metallic seed layer 63. The combination of cavity insulation layer 64 and top pole photoresist layer 66 provide sufficient height so that no overplating occurs in the formation of top pole piece 44.

Figure 7:
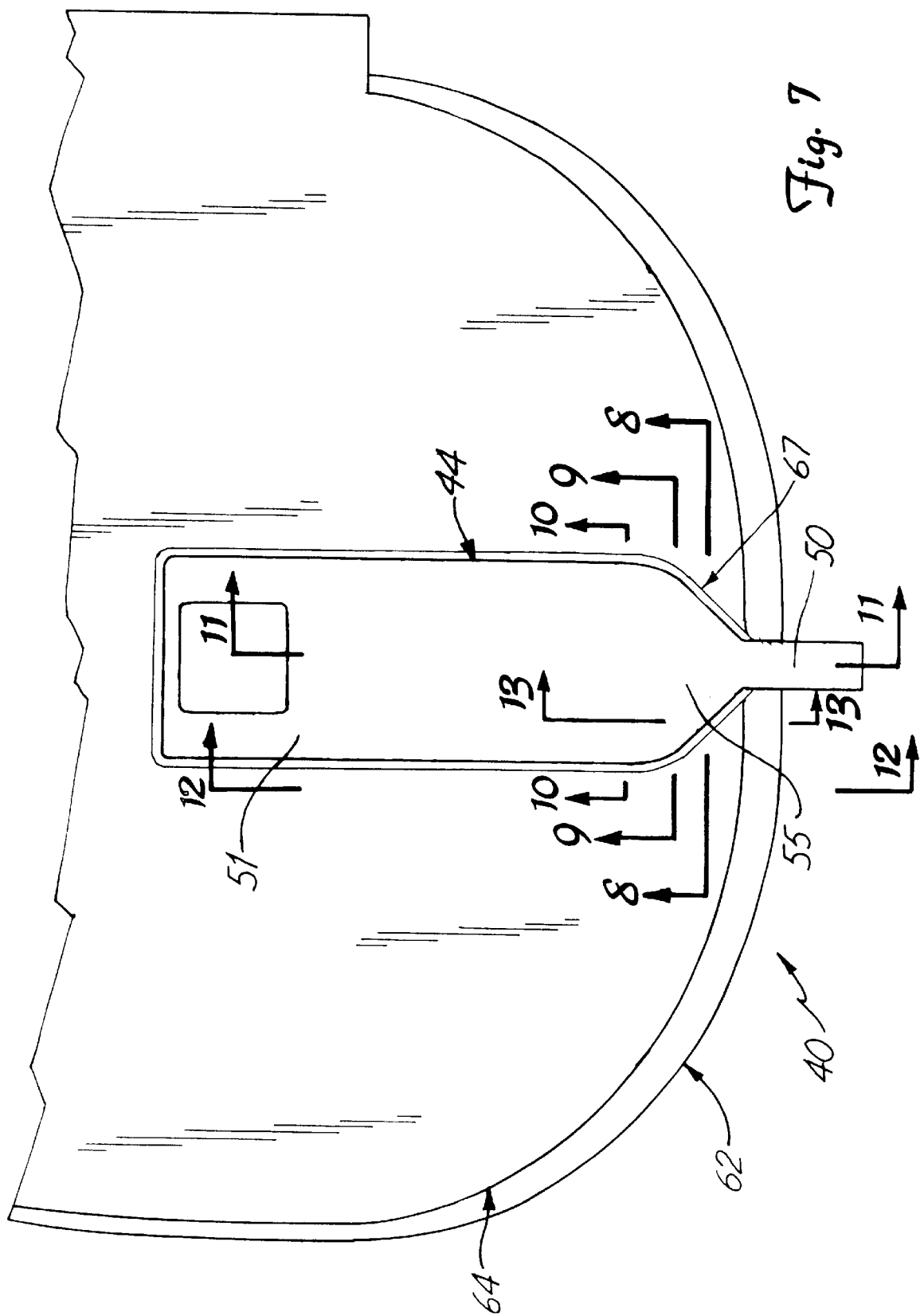
FIG. 7 is a top view of a thin film inductive head in accordance with the present invention.
Figure 8:
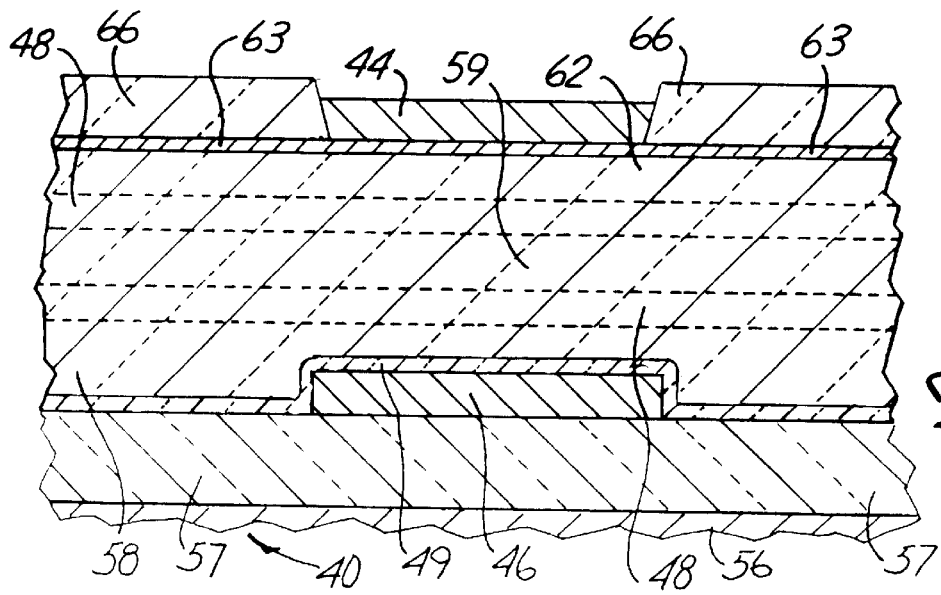
FIGS. 8, 9, and 10 are parallel cross-sectional views taken at lines 8—8, 9—9, and 10—10, respectively, in FIG. 7.
Figure 9:
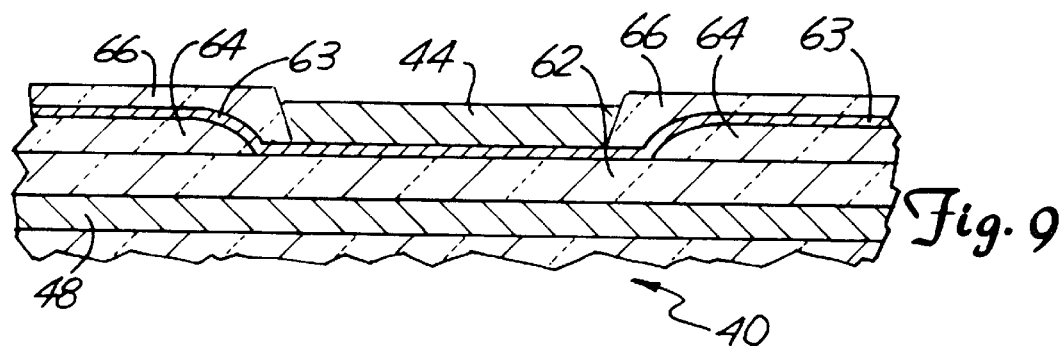

The improved design of thin film head 40 of the present invention is illustrated in hill region 55, as shown in FIGS. 7 and 9. In this area, top pole photoresist layer 66 is thinnest because of the tendency of the material to flow out of that area toward the pole tips, as previously described. However, cavity insulation layer 64 provides extra thickness effectively raising the level of top pole photoresist layer 66 relative to that of top pole piece 44, as top pole piece 44 is in the cavity bowl of cavity insulation layer 64. Thus, the top surface of top pole piece 44 is lower than the top surface of top pole photoresist layer 66. This height differential allows the formation of top pole piece 44 with well defined edges with no overplate.

Figure 10:
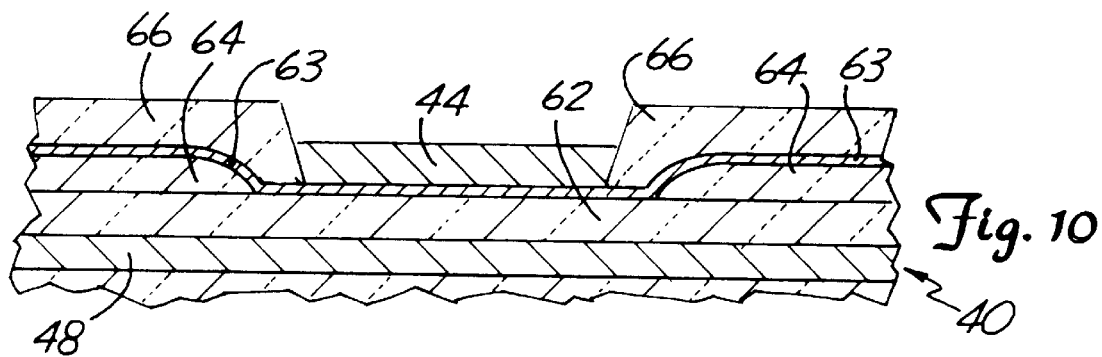
Figure 11:
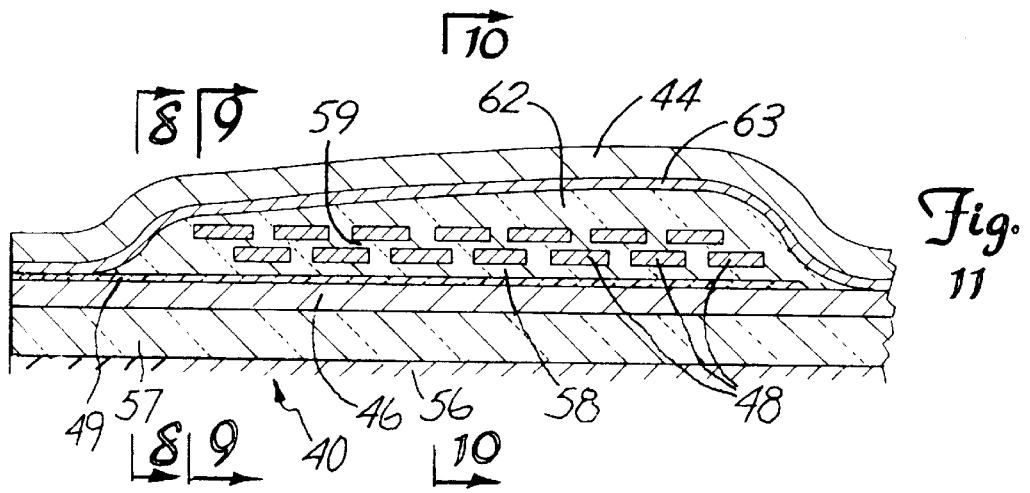
FIGS. 11, 12, and 13 are parallel cross-sectional views taken at lines 11—11, 12—12, and 13—13, respectively, in FIG. 7.

The improved design of thin film head 40 of the present invention is also illustrated in region of top pole paddle 51, as shown in FIGS. 7 and 10. In this area, top pole photoresist layer 66 is still relatively thin because of the tendency of the material to flow out of this area toward the pole tips. Thus, cavity insulation layer 64 also provides extra thickness to this area, effectively raising the level of top pole photoresist layer 66 relative to top pole piece 44. This prevents overplate from forming in this area.

Cavity insulation layer 64 is not in the area of the pole tips. However in this area, top pole photoresist layer 66 is thickest because of the tendency of the material to flow down hill region 55 into that area. Thus, the height of top pole photoresist 66 is above top pole piece 44 which is formed within it. In this way, a sufficient thickness exists for the formation of top pole piece 44 in this area even without cavity insulation layer 64.

Cavity insulation layer 64 is also important for other design parameters. For example, as described above, the sacrificial photoresist layer used on prior art thin film heads for ion milling is too thin in the hill region because of the tendency of the material to flow down to the pole tips. In this way, when the ion milling process was performed, the bombardment of ions not only milled away the sacrificial photoresist, but also some of the top pole piece as well. This lead to significant damage to the thin film head and frustrated overall performance.

Figure 13A:
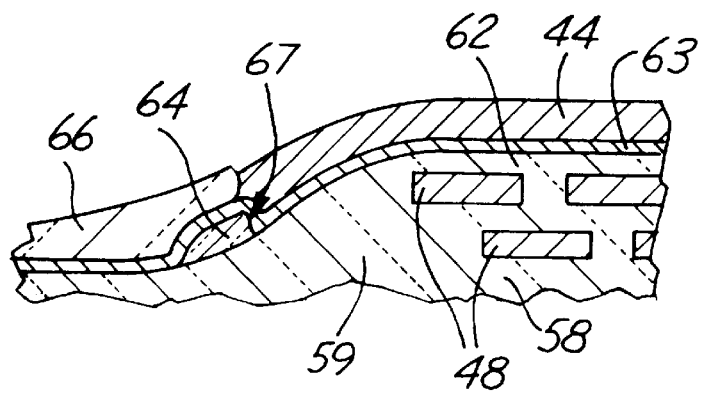
Figure 13B:
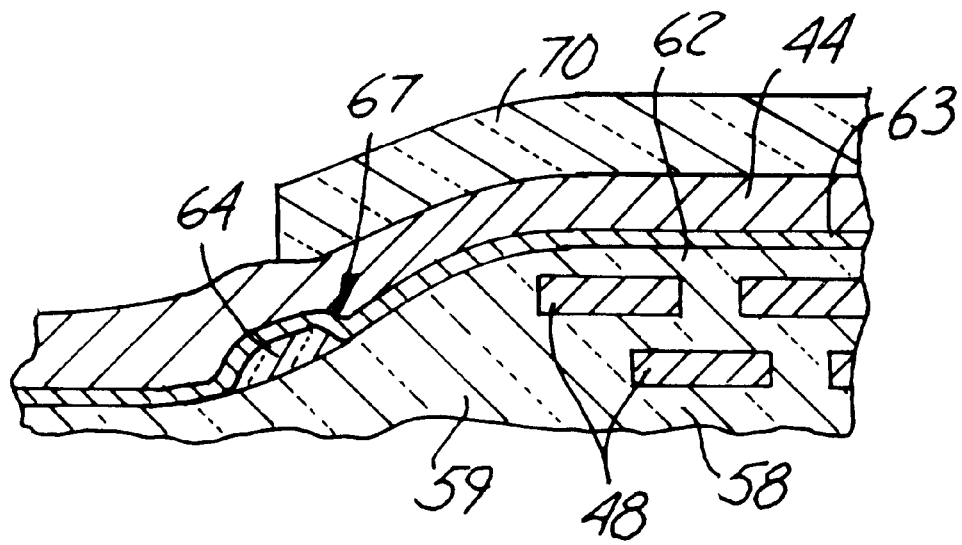
Figure 13C:
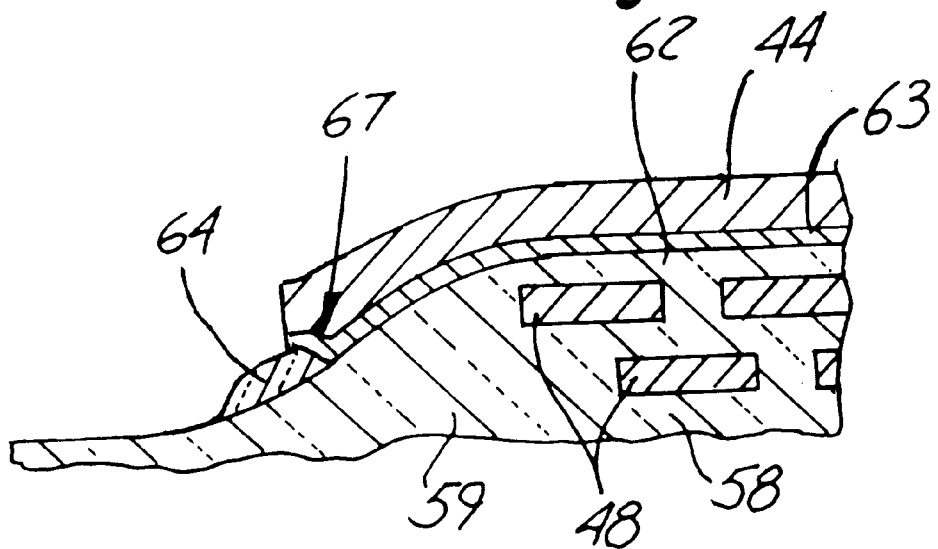

The cavity bowl created by cavity insulation layer 64 in the present invention also solves this problem. Cavity insulation layer 64 includes barrier wall 67 lateral to the flow of photoresist during the spin process. Barrier wall 67, as shown in FIGS. 7 and 13, impedes the flow of photoresist toward the pole tip area, causing the sacrificial photoresist to build up in hill region 55. In this way, the sacrificial photoresist is thicker in hill region 55 where it is needed. Thus, during the subsequent ion milling process, there is ample sacrificial photoresist protection for top pole piece 44 and top pole piece 44 will remain undamaged during the ion milling process.

After top pole piece 44 is milled, any remaining sacrificial photoresist is stripped away. Acetone ($CH_3COCH_3$) is often used for removal. Cavity insulation layer 64, however, is permanent as it has already been cured.

Although the present invention has been described with reference to preferred embodiments, workers skilled in the art will recognize that changes may be made in form and detail without departing from the spirit and scope of the invention. For example, although the present invention has been described with respect to a thin film head having a planer basecoat, persons skilled in the art will recognize that the present invention can also be used with a thin film head with a basecoat that is recessed in the paddle region.

What is claimed is:

1. A thin film magnetic head comprising:
    a bottom magnetic pole piece having a paddle and a tip region;
    an insulation layer on the bottom magnetic pole piece;
    a cavity layer having a predetermined thickness on the insulation layer, the cavity layer containing an aperture defining at least a portion of a paddle region for a top magnetic pole piece on the insulation layer; and a top magnetic pole piece on the insulation layer having a paddle region having a shape at least partially defined by the aperture of the cavity layer and having a tip region, the top magnetic pole piece having a height at least partially defined by the thickness of the cavity layer.

2. The thin film magnetic head of claim 1 wherein the top and bottom magnetic pole pieces have a gap material layer forming a gap between the top and bottom magnetic pole pieces at the tip regions, the thin film magnetic head further including at least a portion of a conductive coil between the paddle regions of the top and bottom magnetic pole pieces, the insulation layer electrically insulating the coil portion from the top and bottom magnetic pole pieces, the coil portion and insulation layer between the paddle regions of the top and bottom magnetic poles forming a hill portion to a profile of the head.

3. The thin film magnetic head of claim 2 wherein the top magnetic pole piece is formed by forming a photoresist layer on the cavity layer with a non-uniform thickness due to the hill portion, the top magnetic pole piece having a shape defined by an opening in the photoresist layer, the height of the top magnetic pole piece being independent of the thickness of the photoresist.

4. The thin film magnetic head of claim 2 wherein the top magnetic pole piece is formed in the aperture of the cavity layer by forming the top magnetic pole piece with a magnetic material having an extra wide pole tip, forming a sacrificial photoresist mask layer on the magnetic material with a non-uniform thickness due to the hill portion, and ion milling the magnetic material and the sacrificial photoresist mask, the top magnetic pole piece shape being defined by the sacrificial photoresist mask and the thickness of the sacrificial photoresist mask being at least partially determined by the depth of the aperture in the cavity layer.

5. The thin film magnetic head of claim 2 wherein the cavity layer is formed in the paddle region and the hill portion.

6. The thin film magnetic head of claim 2 wherein the cavity layer is formed so that it is not in the tip region.

7. The thin film magnetic head of claim 3 including a seed layer between the cavity layer and the photoresist layer.

8. An article of manufacture comprising:

a thin film bottom magnetic pole piece having a paddle and a tip region;

an insulation layer on the thin film bottom magnetic pole piece;

a cavity layer having a predetermined thickness on the insulation layer, the cavity layer containing an aperture defining at least a portion of a paddle region for a top magnetic pole piece on the insulation layer;

a photoresist layer on the cavity layer, the photoresist layer having a non-uniform thickness and an opening with a predetermined shape; and a thin film top magnetic pole piece on the insulation layer and having a paddle region having a shape at least partially in the aperture of the cavity layer and the opening of the photoresist layer, the thin film top magnetic pole piece having a height at least partially based on the thickness of the cavity layer and independent of the thickness of the photoresist layer.

9. The article of manufacture of claim 8 including a seed layer between the cavity layer and the photoresist layer.

10. A thin film magnetic head having a top and a bottom magnetic pole piece and insulation layers between the top and bottom magnetic pole pieces, and means on the insulation layers forming a cavity substantially containing the top magnetic pole piece, the cavity having at least a predetermined depth at least partially defining a height of the top magnetic pole piece.

11. The thin film magnetic head of claim 10 wherein the top and bottom magnetic pole pieces have respective paddle and tip regions with a gap material layer forming a transducing gap between the top and bottom magnetic pole pieces at the tip regions, the thin film magnetic head further including at least a portion of a conductive coil between the paddle regions of the top and bottom magnetic pole pieces, the insulation layers electrically insulating the coil portion from the top and bottom pole pieces, the coil portion and insulation layers between the paddle regions of the top and bottom magnetic poles forming a hill portion to the profile of the head.

12. The thin film magnetic head of claim 11 wherein the top magnetic pole piece is formed by forming a photoresist layer on the cavity-forming means with a non-uniform thickness due to the hill portion, the top magnetic pole piece having a shape defined by an opening in the photoresist layer, the height of the top magnetic pole piece being independent of the thickness of the photoresist.

13. The thin film magnetic head of claim 12 including a seed layer between the cavity-forming means and the photoresist layer.

14. The thin film magnetic head of claim 11 wherein the top magnetic pole piece is formed on the cavity-forming means by forming the top magnetic pole piece with a magnetic material having an extra wide pole tip, forming a sacrificial photoresist mask layer on the magnetic material with a non-uniform thickness due to the hill portion, and ion milling the magnetic material and the sacrificial photoresist mask, the top magnetic pole piece shape being defined by the sacrificial photoresist mask and the thickness of the sacrificial photoresist mask being at least partially determined by the depth of the cavity.

* * * * *